United States Patent
Usuki (12)

(10) Patent No.: US 6,525,908 B1
(45) Date of Patent: Feb. 25, 2003

(54) FLOPPY DISK

(75) Inventor: Kazuyuki Usuki, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 181 days.

(21) Appl. No.: 09/661,197

(22) Filed: Sep. 13, 2000

(30) Foreign Application Priority Data

Sep. 14, 1999 (JP) ............................................ 11-260173

(51) Int. Cl.⁷ .............................................. G11B 23/033
(52) U.S. Cl. ....................................................... 360/133
(58) Field of Search ........................ 360/133; 206/308.3

(56) References Cited

U.S. PATENT DOCUMENTS

| 4,431,818 A | * | 2/1984 | Sawa et al. | 548/334.5 |
| 4,536,312 A | * | 8/1985 | Frangatos | 508/226 |
| 4,612,130 A | * | 9/1986 | Landry et al. | 508/284 |
| 4,901,180 A | * | 2/1990 | Oishi | 360/133 |
| 5,227,082 A | * | 7/1993 | Pillon et al. | 252/390 |
| 5,496,590 A | * | 3/1996 | Maki et al. | 427/388.1 |

FOREIGN PATENT DOCUMENTS

| JP | 62183080 A | * | 8/1987 | .......... G11B/23/033 |
| JP | 03187076 a | * | 8/1991 | .......... G11B/23/033 |
| JP | 05303870 A | * | 11/1993 | .......... G11B/23/033 |
| JP | 053038690 A | * | 11/1993 | .......... G11B/23/033 |

* cited by examiner

Primary Examiner—William Klimowicz
(74) Attorney, Agent, or Firm—Sughrue Mion, PLLC

(57) ABSTRACT

The present invention provides a magnetic recording medium having high recording density and excellent storage property, and it provides a floppy disk, which includes a magnetic disk incorporated in a shell having a liner on inner side thereof, the magnetic disk having a magnetic film formed at least on one side of a flexible support member, and the liner contains a rust preventive agent.

3 Claims, No Drawings

FLOPPY DISK

BACKGROUND OF THE INVENTION

The present invention relates to a floppy disk, and in particular, to a floppy disk type magnetic recording medium having high surface recording density and good storage property.

In a magnetic recording medium such as magnetic tape, hard disk, etc., a vacuum-deposited tape or a metal thin film type hard disk, etc. are used. Using a ferromagnetic metal thin film prepared by vacuum film forming method, i.e. sputtering method, vacuum evaporation method, etc., this magnetic recording medium is used as a recording layer in practical application. In this type of magnetic recording medium, high magnetic energy can be easily obtained, and flat surface can be easily achieved by smoothening the surface of non-magnetic substrate. In this respect, it is characterized in that spacing loss is low and high electromagnetic transfer characteristics can be attained, and this is suitable for a method to manufacture a high-density recording material. In particular, the sputtering method can increase magnetic energy than the vacuum deposition method, and this is adopted in the magnetic recording medium such as hard disk, which must provide high surface recording density.

On the other hand, compared with the hard disk, a floppy disk type magnetic recording medium has higher impact resistance and can be produced at lower cost, and it is widely used in 2HD class products. Further, in recent years, a high-density magnetic recording medium represented by Zip (Iomega Inc.) based thin layer coating technique has been introduced to practical use. In the magnetic recording medium as described above, recording and reproduction are performed at high speed of about 3000 rpm, and high transfer rate closer to that of hard disk can be achieved. However, its recording density is still less than $\frac{1}{10}$ of that of the hard disk. This is attributable to the fact that a floppy disk type magnetic recording medium which has the magnetic layer produced by sputtering method as in case of the hard disk is not yet suitable for practical application.

There are various reasons for this. One of the reasons is that, in the magnetic recording mode using such a floppy disk, it is difficult to attain high reliability including storage property for practical use.

In a floppy disk produced by conventional coating method, oxide film is present on the surface of a magnetic metal particles in a magnetic film, and the magnetic film further contains bonding resin, hard particles, or lubricant. As a result, water, oxygen, corrosive gas, etc. to cause corrosion are generally not brought into direct contact with the magnetic metal particles. Hence, it has high storage property. On the other hand, in a floppy disk, for which the magnetic film is produced by the sputtering method, the magnetic film is a metal thin film, and a protective film comprising carbon and the like and a lubricant film are laminated on it. When storage test is performed under corrosive condition, corrosion develops quicker than the case of the coating type floppy disk.

The corrosion of this metal thin film type floppy disk is caused by pinholes and other defects on the protective film. Through the pinholes, corrosive gas or moisture come into contact with the magnetic film, and corrosion occurs. When film is formed on a mirror-surface substrate, pinholes are not developed on the protective film almost at all. In the floppy disk actually in use, however, it is necessary to provide micro-size and low-profile projections on the surface, and pinholes are generated around the micro-size projections. Similar phenomenon is observed on a hard disk or vacuum deposited tape where the magnetic film is made of metal thin film. Hard disk is stored in relatively clean environment and vacuum deposited tape is stored in rolled-up state. The metal thin film type floppy disk must have higher corrosion resistance than the hard disk or the vacuum deposited tape.

When a magnetic recording medium using metal thin film as the magnetic film is used under general environmental condition, corrosion becomes an important issue, and there are two different mechanisms in the corrosion. The first is the corrosion which occurs when the medium is stored for long time under high temperature and high humidity conditions. In this case, moisture is brought into contact with the magnetic film through pinholes or cracks on the protective film. Corrosive reaction takes place between water and magnetic metal, and a hydroxide of metal such as cobalt hydroxide is generated. The second is the corrosion when the medium is stored for long time under high temperature and high humidity condition where sulfur oxide gas such as sulfur dioxide, or corrosive gas such as hydrogen sulfide gas is present. In this case, corrosive gas is taken up into the moisture, which is present in pinholes and cracks on the protective film. As a result, corrosive reaction occurs between the components derived from the gas and the magnetic metal, and, for example, a metal salt such as cobalt sulfate is generated.

In these corrosive reactions, the presence of water is very important, and the speed or rate of the reaction greatly depends upon environmental humidity, and the reaction is very likely to occur under high humidity condition.

In particular, under general conditions in urban area, it is known that the influence of corrosive gas is strong, and the most controversial corrosive gas is sulfur dioxide. It is also known that the level of corrosion resistance to sulfur dioxide approximately agrees with the level of corrosion resistance to hydrogen sulfide and the like.

In the corrosive reaction as described above, the important action to be taken is to shield and protect the magnetic particles from water and corrosive gas although the corrosive reaction is different in each case. Therefore, the following conditions are required to ensure excellent storage property in the metal thin film type floppy disk:

(1) to use a protective film where pinholes are not present;
(2) to use a lubricant film having high performance characteristics to shield from gas;
(3) to simultaneously use rust preventive agent on the lubricant film; and
(4) to prepare a magnetic film, which is very likely to corrode.

However, in case micro-size projections are present on the surface, it is very difficult to completely eliminate the pinholes on the protective film even when CVD method is used, which is considered to have high coverage rate. Further, when it becomes necessary to decrease the thickness of the protective film to improve the recording density, the frequency to develop pinholes is increased further. Also, the protective film is not formed on edges on inner and outer peripheries of the disk, and it is not possible to prevent the development of corrosion from these edge portions.

In the lubricant film, the lubricant of perfluoropolyether type as generally used for hard disk or the like has low performance characteristics to shield from gas, and it is very difficult to improve corrosion resistance. As a lubricant film having high shielding performance, an orientation film comprising adsorptive film of a compound having long-chain alkyl group such as stearic acid may be considered. The lubricant film of this type has high effect to improve corrosion resistance, while fluid lubricating property is lower than perfluoropolyether, and durability is decreased. When the method to simultaneously use the alkyl type lubricant with perfluoropolyether is used, both durability and corrosion resistance can be attained to some extent, but performance characteristics are not good enough. The lubricant film of this type is worn out through sliding on the head. When the protective film is worn out or cracks occur on the protective film, corrosion develops around the worn or cracked portions. Further, corrosion of the edges cannot be prevented.

A magnetic recording medium containing a rust preventive agent in a magnetic layer or in a protective layer is described in each of JP-A-61-41048, JP-A-6-76272, or JP-B-2650224, or JP-B-3-55886. According to these methods, corrosion resistance can be extensively improved. Each of these methods is very effective to ensure corrosion resistance, but it has less effect to the wearing or the cracking of the protective film because wearing occurs through sliding on the head. Also, the corrosion of the edge portions cannot be prevented.

When an oxide highly resistant to corrosion is used for the magnetic film, corrosion resistance can be extensively improved, while a material suitable for the magnetic recording medium with high recording density such as hard disk is not yet developed, and this cannot be used for the purpose of the present invention.

It is an object of the present invention to provide a floppy disk having the better durability. In particular, the invention provides a floppy disk having sufficient corrosion resistance and durability without impairing the durability of a floppy disk with metal thin film produced by the sputtering method. A magnetic recording medium is provided, which has sufficient corrosion resistance even after the sliding operation by the head on the magnetic surface.

SUMMARY OF THE INVENTION

The present invention provides a floppy disk, which comprises a magnetic disk incorporated in a shell having a liner on inner side thereof, said magnetic disk having a magnetic film formed at least on one side of a flexible support member, and said liner contains a rust preventive agent.

Also, the present invention provides the floppy disk as described above, wherein the magnetic disk is a ferromagnetic metal thin film with the magnetic film produced by vacuum film forming method.

Further, the present invention provides the floppy disk as described above, wherein the rust preventive agent is a nitrogen-containing heterocyclic compound or its derivative.

DESCRIPTION OF THE PREFERRED EMBODIMENT

The floppy disk according to the present invention is characterized in that a liner provided on inner wall of a shell contains a rust preventive agent. The rust preventive agent impregnated in the liner is transferred to the surface of the disk in association with the rotation of the floppy disk, and this contributes to the increase of corrosion-resistant property without impairing the durability. Also, by this method, even when the protective film is worn out due to the sliding against the head or even when cracking may occur on the protective film, the rust preventive agent is transferred to the affected portion, and this contributes to the maintenance of high corrosion-resistant property for long time. Further, the liner is formed by nonwoven fabric made of synthetic resin, and the rust preventive agent is attached even to the edge of the disk, and this is helpful to prevent the development of corrosion from the edge.

According to the present invention, very high effect can be attained in case of a sputtering type floppy disk with the magnetic film produced by sputtering method, while it is also helpful in improving corrosion-resistant property for a floppy disk with a metal magnetic film produced by other vacuum film forming means or a coating type floppy disk, which is produced by dispersing magnetic particles in a binder and by coating it on the floppy disk.

As the rust preventive agent to be used in the floppy disk of the present invention, various type of corrosion inhibitors may be used, which have effects to improve corrosion-resistant property against cobalt or iron, which is contained in the magnetic film. For example, nitrogen-containing heterocyclic compound, sulfur-containing heterocyclic compound, oxygen-containing heterocyclic compound, heterocyclic compound containing dissimilar hetero atoms such as thiazole or its derivatives, inorganic salt or organic salt of amine or imine, phenols, naphthols, diallylketones, quinones, oxime compounds, thiols, etc. may be used.

As more concrete examples of the rust preventive agent, the nitrogen-containing heterocyclic compounds and their derivatives include indole, indolin, carbazole, pyrazole, indazole, imidazole, benzoimidazole, pyridine, quinoline, acridine, phenanthridine, phenanthroline, neocuproin, pyrimidine, triazole, benzotriazole, tetrazaindene, purine, pyrrolidine, triazolopyrimidine, hypoxanthine, etc., and compounds comprising organic residual group such as alkyl group, fluoroalkyl group, etc., or functional group such as hydroxyl group, mercapto group, amino group, etc.

The sulfur-containing heterocyclic compounds and their derivatives include 2-thenoyltrifluoroacetone, 3-hydroxysulfolane, 3-methylsulfolane, etc.

The oxygen-containing heterocyclic compounds and their derivatives include quercetine, morin, luteolin, ascorbic acid, tocopherol, etc.

The heterocyclic compounds containing dissimilar hetero atoms and its derivatives include thiazole, benzothiazole, benzooxazole, 1,3,4-thiadiazole, etc., and compounds comprising organic group such as alkyl group, fluoroalkyl group, or functional group such as hydroxyl group, mercapto group, amino group, etc.

The inorganic salt or the organic salt of amine or imine include dicyclohexylamine nitrite, dicyclohexylamine carbamate, dicyclohexylamine chromate, diisopropylamine nitrite, monoethanolamine phthalate, hexamethylenediamine arbonate, nitronaphthylamine nitrite, etc.

The phenols include hydroquinone, resorcin, catechol, cresol, etc., and further, compounds comprising these substances with alkyl group, amino group, nitro group, or halogeno group introduced therein.

The naphthols include naphthol, naphthalenediol, etc., and compounds comprising these substances with alkyl group, amino group, nitro group, or halogeno group, introduced therein.

Diallylketone include benzophenone, and further, compounds comprising this substance with alkyl group, amino group, nitro group or halogeno group introduced therein.

The quinones include benzoquinone, naphthoquinone, anthraquinone, etc., and compounds comprising these substances with alkyl group, amino group, nitro group, or halogeno group introduced therein.

The oximes include benzyloxime, glyoxime, benzaldoxime, benzamideoxime, etc.

The thiols include thiophenol, 2-benzoxazolethiol, thiouracil, 5-nitro-2-benzoimidazolethiol, etc.

Among these rust preventive agents, those exhibiting excellent rust preventive function under high temperature and high humidity conditions and under corrosive gas atmosphere are the nitrogen-containing heterocyclic compounds, heterocyclic compounds containing hetero atoms, and derivatives of these compounds. Among them, extremely effective compounds are pyrimidine, triazole, benzotriazole, imidazole, benzimidazole, tetrazaindene, thiazole, benzothiazole, etc., and compounds comprising these substances containing organic residual group such as alkyl group, fluoroalkyl group, etc., or functional group such as hydroxyl group, mercapto group, amino group, etc.

More concretely, as 2-mercapto-pyrimidine derivative (compound 1), 2-mercapto-4-undecyl-6-oxypyrimidine, 2-mercapto-4-heptadecyl-6-oxypyrimidine, or 4-hydroxy-1,3,3a,7-tetrazaindene derivative may be used. As 4-hydroxy-1,3,3a,7-tetrazaindene derivative (compound 2), 4-hydroxy-6-methyl-1,3,3a,7-tetrazaindene, 4-hydroxy-6-nonyl-1,3,3a,7-tetrazaindene, 4-hydroxy-6-propoxycarbomethyl-1,3,3a,7-tetrazaindene, 4-hydroxy-6-hexyloxycarbomethyl-1,3,3a-7-tetrazaindene, 4-hydroxy-6-phenoxycarbomethyl-1,3,3a,7-tetrazaindene, 4-hydroxy-6-(N-vinylbenzylcarbamoylmethyl)-1,3,3a-7-tetrazaindene, or 6-(N-(2-chlorophenyl)-carbamoylmethyl)-4-hydroxy-1,3,3a,7-tetrazaindene may be used. As 2-mercapto-benzimidazole derivative (compound 3), 6-decanoamide-2-mercaptobenzimidazole, or 6-(2-ethylhexanoylamino)-2-mercaptobenzimidazole may be used. As imidazole-2-thione derivative (compound 4), 3-(4-heptylaminocarbonylphenyl)-imidazole-2-thione, 3-(4-dodecylaminocarbonylphenyl)-imidazole-2-thione, etc. may be used.

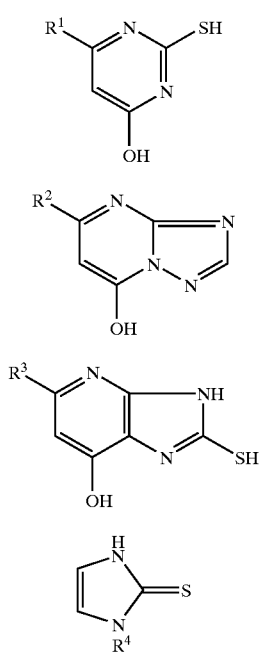

Compound 1

Compound 2

Compound 3

Compound 4 where $R^1$ to $R^4$ each represents an organic residual group;

hydrogen or a saturated hydrocarbon group or an unsaturated hydrocarbon group containing 1 to 18 carbon atoms;

Organic group expressed by $R^5$—X—$R^6$, where $R^5$ represents a saturated hydrocarbon group or an unsaturated hydrocarbon group containing 1 to 12 carbon atoms;

$R^6$ represents a saturated hydrocarbon group or an unsaturated hydrocarbon group containing 1 to 12 carbon atoms;

X represents a linking group such as ester, ether or amide group;

An organic residual group, in which a part or all of the above saturated or unsaturated hydrocarbon groups are substituted by fluorine.

These rust preventive agents may be used alone or in combination.

To provide these rust preventive agents to a liner, the rust preventive agent is dissolved in a solvent or water, and this solution is coated by coating method such as spray coating, dip coating, etc., and it is then dried. In this case, it is preferable to use the rust preventive agent in such an amount that sufficient rust preventive effect can be provided without depositing rust preventive agent. The concentration is preferably within the range of 0.1 to 1000 ppm.

As the liner, to which the rust preventive agent is provided, polyester type fibers including cellulose fibers such as rayon fiber, polynosic fiber, cupra fiber, acetate fiber, or nonwoven fabric blended with acrylic fibers may be used. The liner may contain heat-bonding type fibers to ensure adhesion with the shell.

Also, the liner may contain lubricant, antistatic agent, fungicide, etc. in addition to the rust preventive agent of the present invention. As the lubricant, hydrocarbon type lubricant, fluorine type lubricant, extreme-pressure additive, etc. may be used, which are used on a metal thin film type magnetic recording medium such as hard disk, or a magnetic recording medium with coating type magnetic layer such as vacuum deposition type magnetic layer. Special care must be taken on the use of the lubricant having high acidity such as sulfonic acid or carboxylic acid with α-position substituted with fluorine because this may corrode the magnetic film. Preferably, a lubricant containing phosphoric acid group, hydroxyl group, or ester group may be used.

Examples of the lubricants to be used in the present invention are as follows:

As the hydrocarbon type lubricant, carboxylic acids such as stearic acid, oleic acid, etc., esters such as butyl stearate, oleyl oleate, etc., phosphoric acid esters such as monooctadecyl phosphate, distearyl phosphite, etc., alcohols such as stearyl alcohol, oleyl alcohol, etc., carboxylic acid amides such as stearic acid amide, and amines such as stearyl amine may be used.

As the fluorine type lubricant, the hydrocarbon lubricant as described above may used, in which a part or all of alkyl groups are substituted with fluoroalkyl group or perfluoropolyether group. The perfluoropolyether group include perfluoromethylene oxide polymer, perfluoroethylene-oxide polymer, perfluoro-n-propyleneoxide polymer $(CF_2CF_2CF_2O)_n$, perfluoroisopropyleneoxide polymer $(CF(CF_3)CF_2O)_n$ or copolymer of these substances may be used. Further, a compound comprising phosphagen cycle, to which fluorine or alkyl fluoride group is introduced, is thermally and chemically sable and may be used.

As the extreme-pressure additives, phosphoric acid esters such as trilauryl phosphate, phosphorous acid esters such as trilauryl phosphite, phosphorous acid esters such as trilauryl phosphite, thiophosphorous acid ester such as trilauryl trithiophosphite or thiophosphoric acid esters, sulfur type extreme-pressure agent such as dibenzyl disulfide may be used.

These lubricants may be used alone or in combination.

Antistatic agent, fungicide, etc. may be used together with the lubricant. As the antistatic agents, anion type, cation type, or nonionic type antistatic agents, or paraffin type antistatic agents may be used.

As the fungicides, the following compounds may be used: 2-(4-thiazolyl)benzoimidazole, N-(fluorodichloromethylthio)-phthalimide, N,N-dimethyl-N'-phenyl-N'-fluorodichloromethyl-thiosulfamide, 2,3,5,6-tetrachloro-4-methylsulfonyl-pyridine, 2-octylisothiazolin-3-on, hexahydro-1,3,5-tris(2-hydroxyethyl)-S-triazine, benzylbromoacetate, 2-pyridinethiol sodium-1-oxide, potassium-N-hydroxymethyl-N-methyldithiocarbamate, dithio-2',2'-bis(benzomethylamide). These fungicides may be used alone or in combination.

The content of the fungicide in the liner is preferably within the range of 0.1 to 1000 ppm, or more preferably within the range of 5 to 500 ppm. If the content of the fungicide is less than 0.1 ppm, antifungal effect is not strong enough. If the content exceeds 1000 ppm, problems may arise during writing or reading of information to or from the magnetic recording medium.

As the liner, nonwoven fabric made of fibers such as rayon fibers, polyester fibers, or acrylic fibers may be used.

The magnetic recording medium according to the present invention is suitable for a magnetic recording medium having metal thin film magnetic layer, and it is particularly suitable for a floppy disk with metal thin film magnetic layer produced by sputtering. In the following, description will be given on a floppy disk having metal thin film magnetic layer provided by sputtering.

As a support member of the floppy disk, a film of 20 to 100 μm in thickness of polyimide, polyamide, polyethylene naphthalate, polyethylene terephthalate, etc. may be used. To ensure high electromagnetic transfer characteristics, it is preferable that surface roughness (Ra) of the magnetic film surface is not more than 2 nm, and maximum surface roughness (Rmax) is not more than 60 nm.

In case the surface of the support member does not satisfy the surface roughness required for the surface property of the magnetic film, an undercoating film may be prepared on the surface to form the magnetic layer on the surface of the support member, and after the surface has been smoothened, the magnetic film may be formed. As the material for the undercoating film, thermosetting imide or thermosetting silicone resin having high smoothening effect is preferably used. The thickness of the undercoating film is preferably 0.1 to 3 μm. The thermosetting resin can be produced, for example, by coating an imide monomer which can be hardened by heat or a monomer containing silane coupling agent having epoxy group, and then by hardening it by heating.

The thermosetting imide is a monomer with an imide structure and a polymerizable terminal group in the molecule. This monomer is polymerized by heating and is turned to polyimide structure, and it has hence high heat-resistant property. This thermosetting imide is in the state of monomer before bonding, and it is soluble in wide variety of solvents. In this respect, it is easy to dry up the solvent. Further, it has low solution viscosity and is suitable for micro-filtration, and foreign objects are less frequently intermingled. As the thermosetting imide as described above, it is particularly effective to use bis-allylnadiimide expressed by the following chemical formula 5:

Chemical formula 5

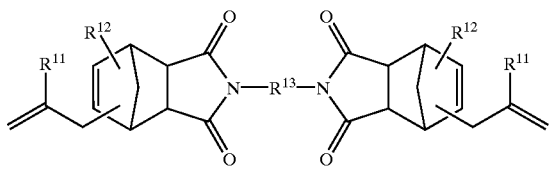

where $R^{11}$ and $R^{12}$ each represents a hydrogen or a methyl group independently selected, and $R^{13}$ denotes a bivalent linking group such as aliphatic or aromatic hydrocarbon group. For example, alkylene group and alkenyl group of straight-chain or branched structure, cycloalklylene group cycloalkylene group having alkylene group, aromatic group, aromatic group having alkylene group, polyoxyalkylene group, carbonyl group, ether group, etc. may be used.

As already known in the art, when micro-size and low-profile projections are provided on the surface of the medium, true contact area between the medium and the sliding member can be decreased, and sliding property can be improved. In this respect, it is particularly preferable to provide micro-size projections on the surface of the magnetic layer. To prepare such micro-size projections on the surface, there are methods such as a method to coat spherical silica particles, a method to form organic projections by coating emulsion, etc. To maintain heat-resistant property, it is preferable to use silica particles. To fix the projections on film surface, a binder may be used. To maintain heat-resistant property, it is preferable to use resin with high heat-resistant property. In particular, it is preferable to use thermosetting imide or thermosetting silicone resin as such material.

The height of the micro-size projections is 5–60 nm, or more preferably, 10–30 nm. Its density is preferably 0.1–100 projections/μm², or more preferably, 1–30 projections/μm. If the height of the micro-size projections is too high, electromagnetic transfer characteristics are decreased due to spacing between the recording/reproducing head and the medium. If the micro-size projections are too low, the effect to improve the sliding property is decreased. If the density of the micro-size projections is too low, the effect to improve sliding property is decreased. If it is too high, higher projections are increased due to the increase of agglomerated particles, and this leads to lower electromagnetic transfer characteristics. The coating thickness of the binder is preferably not more than 20 nm. If the binder is too thick, blocking (i.e. the bonding to the rear surface of the film) may occur after drying.

As ferromagnetic metal thin film to be used as the magnetic layer in the magnetic disk of the present invention, the film prepared by the sputtering method may be used. As the composition of the film, metal or alloy primarily based on cobalt may be used. More concretely, Co—Cr, Co—Ni—Cr, Co—Cr—Ta, Co—Cr—Pt, Co—Cr—Ta—Pt, Co—Cr—Pt—Si, Co—Cr—Pt—B, etc. may be used. In particular, it is preferable to use Co—Cr—Pt or Co—Cr—Pt—Ta to improve electromagnetic transfer characteristics. It is preferable that the thickness of the magnetic layer is 10–30 nm.

In this case, it is preferable to provide an underlying film to improve static magnetic property of the magnetic layer. As the composition for the underlying film, metal or alloy already known in the art may be used. More concretely, Cr, V, Ti, Ta, W, Si, etc. or alloy of these metals may be used, or more preferably, Cr, Cr—Ti, and Cr—V may be used. The thickness of the underlying film is preferably 5–50 nm, or more preferably, 10–30 nm. To control crystal orientation of the underlying film, it is preferable to use a shield layer under the underlying film. More concretely, it is preferable to use Ta, Mo, W, V, Zr, Cr, Rh, Hf, Nb, Mn, Ni, Al, Ru, Ti or alloy of these metals. More preferably, Ta, Cr, Ti or alloy of these metals may be used. The thickness is preferably 15–60 nm. When the magnetic layer is prepared by the sputtering method, it is preferable to form the film by heating the substrate. In this case, the temperature is about 200° C.

In the magnetic recording medium of the present invention, it is preferable to provide a protective film of the ferromagnetic metal thin film, and running durability and corrosion resistant property can be extensively improved by this protective film. As the protective films, protective films made of oxides such as silica, alumina, titania, zirconia, cobalt oxide, nickel oxide, etc., nitrides such as titanium nitride, silicon nitride, boron nitride, etc., carbides such as silicon carbide, chromium carbide, boron carbide, etc., or carbon such as graphite or amorphous carbon may be used. These protective films preferably have hardness equal to or higher than the hardness of the material of the magnetic head. It is also preferable that the protective films are less susceptible to seizure during sliding operation and have stable and continuous effects. As such type of protective film, a hard carbon film called diamond-like carbon film is used.

The diamond-like carbon film used as the protective film is an amorphous carbon film produced by plasma CVD method, sputtering method, etc. Microscopically, it is a mixture of a cluster provided by sp2 linking and a cluster provided by sp3 linking. The hardness of this film is preferably 1000 kg/mm$^2$ or more in Vickers hardness, or more preferably, 2000 kg/mm$^2$ or more. When the diamond-like carbon film is measured by Raman spectroscopy, a main peak called "G peak" is detected near 1540 cm$^{-1}$, and a shoulder called "D peak" is detected near 1390 cm$^{-1}$.

These diamond-like carbon films can be produced by sputtering method or CVD method, while it is preferably produced by CVD method because productivity and product quality are stable and high wear resistant property can be maintained even in case of ultra-thin film of less than 10 nm in thickness, and pinholes can be minimized. In particular, it is preferable to use the following method: Carbon-containing compounds including alkane such as methane, ethane, propane, butane, etc., alkene such as ethylene, propylene, etc., or alkyne such as acetylene, etc. are decomposed by plasma, and the chemical substances thus generated are stacked on a substrate by applying negative bias voltage. Also, friction coefficient of the film can be decreased by giving nitrogen into the protective film by the introduction of nitrogen gas into the reactive gas. If the hard carbon protective film is too thick, electromagnetic transfer characteristics may be worsened or adhesion property to the magnetic layer may be decreased. If film thickness is too thin, wear resistance is not high enough. In this respect, the film thickness is preferably in the range of 2 to 30 nm, or more preferably, within the range of 5 to 20 nm.

In the magnetic recording film of the present invention, lubricant film may also be provided on the protective film with the purpose of improving running durability and corrosion resistant property. As the lubricant, the same types of lubricants as contained in the liner, i.e. hydrocarbon type lubricant, fluorine type lubricant, extreme-pressure additive, etc. may be used. These lubricants may be used alone or in combination. To provide the lubricant to the protective film, the lubricant is first dissolved in an organic solvent and it may be coated by wire bar coating, gravure coating, spin coating, dip coating, etc., or it may be attached by vacuum deposition method.

The coating quantity of the lubricant is preferably within the range of 1–30 mg/m$^2$, or more preferably, within the range of 2–20 mg/m$^2$.

If a rust preventive agent is provided in the lubricant film or between the lubricant film and the magnetic film or the protective film, it is possible to increase corrosion resistance by cumulative effects with the rust preventive agent transferred from the liner. As the rust preventive agent used for this purpose, the same compound as the compound impregnated in the liner may be used.

[Embodiments]

Description will be given below on the present invention referring to examples.

EXAMPLE 1

On both surfaces of polyimide film with maximum surface projection roughness of 200 nm and with thickness of 75 μm, thermosetting type imide resin (Maruzen Petrochemical Co, Ltd.; BANI-NB) was dissolved in a mixed solvent of ethanol and cyclohexanone (1:1 in weight ratio). This solution was filtered through a membrane filter with pore size of 0.1 μm, and this was coated on both surfaces of polyimide film. This was heated at 250° C. for 12 hours, and an undercoating film was prepared. Further, organo-silica sol with particle size of 18 nm dispersed in cyclohexanone was coated on the undercoating film by dip coating method. This was dried at 250° C. for one hour, and micro-size projections were formed on the surface of the undercoating film.

The density of the micro-size projections was 10 projections/μm$^2$. Next, this support member was squeezed by a holder and was placed in a sputtering device for forming a magnetic layer. After the support member was heated at 200° C., a Cr—Ti underlying film (component ratio 80:20) was formed in thickness of 30 nm by DC magnetron sputtering method. Further, Co—Cr—Pt magnetic layer (component ratio 68:20:12) of 25 nm in thickness was formed. The underlying film and the magnetic layer were formed on both surfaces of the support member. Further, the surface of the magnetic layer was cleaned up by argon glow discharge. Then, with bias voltage of −500 V applied on the magnetic film, a nitrogen-containing diamond-like carbon protective film of 20 nm in thickness was prepared by RF plasma CVD method using ethylene, nitrogen and argon (component ratio 3:2:5) as the reactive gases. Then, this was taken out from the holder. A rust preventive agent 4-hydroxy-6-n-nonyl-1,3,3a,7-tetrazaindene was dissolved in a mixed solvent of methyl ethyl ketone and methanol (1:1 in weight ratio), and this was coated on the protective film prepared above and was dried. The coating quantity of the rust preventive agent was set to 5 μm/m$^2$. Perfluoropolyether type lubricant (Ausimont; Fomblin Z-Dol) and fluorine-introduced phosphagen cyclic compound (Dow Chemical; X-1P) were dissolved in a fluorine type solvent (Sumitomo 3M; HFE-7200). This solution was filtered through a filter with pore size of 0.1 μm, and this was coated on the above protective layer by dip coating method, and a lubricant film of 1 nm in thickness was prepared. This specimen was punched into a shape of 3.7-inch type magnetic disk. This disk had coercive force of 2200 Oe.

As the liner of cartridge for Zip 100 (Iomega Inc.), nonwoven fabric was used, which comprised rayon fiber (100%) for the surface of the magnetic recording medium, "rayon fiber (50%)+nylon fiber (50%)" for intermediate layer, and rayon fiber (100%) for shell surface. This was punched in doughnut-like shape in almost the same size as the floppy disk and was used.

Next, a rust preventive agent as shown in Table 1 was dissolved in methanol, and this solution was coated by spray coating method, and it was then dried so that the content of the rust preventive agent after drying was to be 100 ppm to the weight of the liner. To this cartridge, the magnetic disk prepared above was incorporated, and a floppy disk medium was obtained.

On the floppy disk thus prepared, two different storage tests as given below were performed. A magnetic recording medium not subjected to running operation, and a floppy disk set on Zip 100 drive under the environmental conditions of 23° C. and 50% relative humidity and was subjected to running operation for a full day per each of 3 tracks (inside, middle and outside), i.e. running operation for 3 days in total, were used as the specimens. Each specimen was tested by the following evaluation method. The results are shown in Table 2.

(Evaluation Methods)

Test 1 High Temperature High Humidity Storage Test

The floppy disk was stored for 7 days under the environmental conditions of 60° C. and 90% relative humidity, and the changes of coercive force before and after the storage were evaluated. In the results of evaluation, it was defined as A when the rate of change of coercive force was less than 5%, B when it was 5 to 10%, and C when it was more than 10%.

Test 2 Sulfur Dioxide Gas Corrosion Test

The floppy disk was stored for 7 days under the condition of 40° C., 80% relative humidity and 1 ppm of sulfur dioxide. After the storage, disk surface was examined visually and under microscope. In the results, when almost no corrosion was found under microscope, it was defined as A. When no change was observed in almost all areas or corrosion was slightly recognized by visual inspection, it was defined as B. When corrosion was clearly observed by visual inspection, it was defined as C.

TABLE 1

| Specimen | Rust preventive agent provided to the liner |
| --- | --- |
| Example 1 | 2-mercapto-4-undecyl-6-oxypyrimidine |
| Example 2 | 2-mercapto-4-heptadecyl-6-oxypyrimidine |
| Example 3 | 4-hydroxy-6-methyl-1,3,3a,7-tetrazaindene |
| Example 4 | 4-hydroxy-6-nonyl-1,3,3a,7-tetrazaindene |
| Example 5 | 4-hydroxy-6-propoxycarbomethyl-1,3,3a,7-tetrazaindene |
| Example 6 | 4-hydroxy-6-hexyloxycarbomethyl-1,3,3a,7-tetrazaindene |
| Example 7 | 6-decanoamide-2-mercaptobenzimidazole |
| Example 8 | 3-(4-heptylaminocarbonylphenyl)-imidazaole-2-thione |
| Example 9 | Benzotriazole |
| Example 10 | Oxazole |
| Example 11 | 2-mercaptobenzthiazole |
| Example 12 | Dicyclohexylammonium nitrite |
| Example 13 | 2-amino-1-naphthol |
| Example 14 | 1,2-naphthoquinone |
| Example 15 | α-benzoinoxime |
| | 4-hydroxy-6-nonyl-1,3,3a,7-tetrazaindene |
| Example 16 | The rust preventive agent was not provided to protective film. |

TABLE 1-continued

| Specimen | Rust preventive agent provided to the liner |
| --- | --- |
| Comparative example 1 | None |
| Comparative example 2 | None; Rust preventive agent was not provided to the protective film. |

TABLE 2

Results of evaluation on Examples and Comparative examples

| Test method Specimen | Storage test A Before running | Storage test A After running | Storage test B Before running | Storage test B After running |
| --- | --- | --- | --- | --- |
| Example 1 | A | A | A | A |
| Example 2 | A | A | A | A |
| Example 3 | A | A | A | A |
| Example 4 | A | A | A | A |
| Example 5 | A | A | A | A |
| Example 6 | A | A | A | A |
| Example 7 | A | A | A | A |
| Example 8 | A | A | A | A |
| Example 9 | A | B | A | A |
| Example 10 | A | B | A | A |
| Example 11 | A | B | A | A |
| Example 12 | B | B | A | B |
| Example 13 | B | B | A | B |
| Example 14 | B | B | A | B |
| Example 15 | B | B | A | B |
| Example 16 | B | B | A | B |
| Comparative example 1 | B | C | A | C |
| Comparative example 2 | C | C | C | C |

According to the present invention, the rust preventive agent is provided to the liner, and this makes it possible to prevent corrosion under high temperature and high humidity condition and under sulfur dioxide corrosive atmosphere. This effect is particularly remarkable in the specimen after the running operation. Among the rust preventive agents, remarkable effects were found when nitrogen-containing heterocyclic compounds were added.

What is claimed is:

1. A floppy disk, comprising a magnetic disk incorporated in a shell having a liner on inner side thereof, said magnetic disk having a magnetic film formed at least on one side of a flexible support member, and said liner contains at least one rust preventive agent selected from the group consisting of pyrimidine, triazole, benzotriazole, tetrazaindene, thiazole, and benzothiazole.

2. A floppy disk according to claim 1, wherein said magnetic film is a ferromagnetic thin film prepared by vacuum film forming method.

3. A floppy disk according to claim 1, wherein the magnetic film is a ferromagnetic thin film prepared by vacuum film forming method.

* * * * *